(12) United States Patent
Quidant et al.

(10) Patent No.: US 10,859,489 B2
(45) Date of Patent: Dec. 8, 2020

(54) HAND-HELD MICROFLUIDIC DETECTION DEVICE THAT USES A PARASITIC LIGHT SUPPRESSING MECHANISM TO REDUCE BACKGROUND NOISE

(71) Applicants: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES); IMAGINE OPTIC SPAIN SL, Sant Just Desvern (ES)

(72) Inventors: Romain Quidant, Castelldefels (ES); Luis Miguel Fidalgo, Castelldefels (ES); Rafael Porcar, Castelldefels (ES)

(73) Assignees: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES); IMAGINE OPTIC SPAIN SL, Sant Just Desvern (ES)

(*) Notice: Subject to any disclaimer, the term of this patent is extended or adjusted under 35 U.S.C. 154(b) by 0 days.

(21) Appl. No.: 16/632,127

(22) PCT Filed: Jul. 3, 2018

(86) PCT No.: PCT/EP2018/067880
§ 371 (c)(1),
(2) Date: Jan. 17, 2020

(87) PCT Pub. No.: WO2019/015947
PCT Pub. Date: Jan. 24, 2019

(65) Prior Publication Data
US 2020/0225145 A1 Jul. 16, 2020

(30) Foreign Application Priority Data

Jul. 19, 2017 (EP) .................................... 17382474

(51) Int. Cl.
*G01N 21/05* (2006.01)
*G01N 21/64* (2006.01)
(Continued)

(52) U.S. Cl.
CPC ........ *G01N 21/05* (2013.01); *B01L 3/502715* (2013.01); *G01N 21/645* (2013.01);
(Continued)

(58) Field of Classification Search
None
See application file for complete search history.

(56) References Cited

U.S. PATENT DOCUMENTS

2004/0126279 A1 7/2004 Renzi et al.
2010/0321696 A1 12/2010 Malik et al.
(Continued)

FOREIGN PATENT DOCUMENTS

WO WO 2012/088351 A2 6/2012
WO WO 2017/018977 A1 2/2017

OTHER PUBLICATIONS

Cho et al., "Microfluidic Photonic Integrated Circuits," SPIE, PO Box 10 Bellingham WA 98227-0010 USA, vol. 7135, No. 7135M-1-7135M-10 (2008).
(Continued)

*Primary Examiner* — Michael P LaPage
(74) *Attorney, Agent, or Firm* — Jenkins, Wilson, Taylor & Hunt, P.A.

(57) ABSTRACT

The present invention relates to a hand-held microfluidic detection device, comprising: —a microfluidic cell (M) having at least one chamber intended to at least contain a
(Continued)

sample; —a support (S) comprising a housing for the removable attachment thereto of the microfluidic cell (M); —excitation light means arranged at least in part in the support (S) to side illuminate the at least one chamber of the microfluidic cell (M) to excite the sample contained therein; —an optical detector (D) configured and arranged to detect light emitted from the sample when excited with said side illumination; and —a casing (C) constituting an envelope into which at least the support (S) is housed and attached.

21 Claims, 10 Drawing Sheets

(51) Int. Cl.
  *B01L 3/00* (2006.01)
  *G01N 21/03* (2006.01)
(52) U.S. Cl.
  CPC ............... *G01N 2021/0346* (2013.01); *G01N 2201/0221* (2013.01)

(56) References Cited

U.S. PATENT DOCUMENTS

| | | |
|---|---|---|
| 2011/0134420 A1* | 6/2011 | Matsumoto ....... B01L 3/502715 356/246 |
| 2014/0264082 A1 | 9/2014 | Ayliffe |
| 2014/0370586 A1* | 12/2014 | Seo ................... B01L 3/502715 435/288.7 |
| 2015/0346097 A1 | 12/2015 | Battrell et al. |
| 2019/0039067 A1* | 2/2019 | Aoki ........................ G01N 1/14 |

OTHER PUBLICATIONS

International Search Report corresponding to International Application No. PCT/EP2018/067880 dated Sep. 18, 2018.

Myers et al., "Innovations in optical microfluidic technologies for point-of-care diagnostics," Lab On a Chip, vol. 8, No. 12, pp. 2015-2031 (2008).

Written Opinion of the International Searching Authority corresponding to International Application No. PCT/EP2018/067880 dated Jan. 24, 2019.

* cited by examiner

HAND-HELD MICROFLUIDIC DETECTION DEVICE THAT USES A PARASITIC LIGHT SUPPRESSING MECHANISM TO REDUCE BACKGROUND NOISE

FIELD OF THE INVENTION

The present invention relates to a hand-held microfluidic detection device that uses a parasitic light suppressing mechanism to reduce background noise, designed to provide an improved in field detection of analytes in liquid samples, in a closed environment through removably attached microfluidic cells.

BACKGROUND OF THE INVENTION

Plenty of microfluidic detection devices, particularly fluid and optical interrogation devices, exist in the prior art, but most of them are not hand-held, but intended to be used with on lab detections systems, i.e. under well-controlled environmental conditions. However, for some applications, there is a need to perform in field detections, i.e. under not controlled environmental conditions, so hand-held microfluidic detection devices are needed to meet that purpose.

Very few hand-held microfluidic detection devices exist in the art. Those hand-held devices have to integrate both the fluidic system needed to contain a sample to be analysed and a transduction technique detection system (such as an optical detection system comprising a light source and an optical detector).

One of those hand-held microfluidic detection devices is disclosed by International patent application WO2012088351A2, and comprises the features included in the preamble of claim 1 of the present invention, i.e.:

a microfluidic cell having at least one chamber intended to at least contain a sample;

a support (called removable housing) configured for the attachment thereto of the microfluidic cell;

excitation light means arranged in the support to side illuminate the at least one chamber of the microfluidic cell to excite the sample contained therein; and an optical detector configured and arranged to detect light emitted from the sample when excited with said side illumination.

In the device disclosed by WO2012088351A2, the optical detector is a built-in camera of a mobile device (such as a mobile phone) which is coupled to the removable housing.

Although the device disclosed by WO2012088351A2 allows in field optical detections, the results obtained therewith can be clearly improved, mainly in terms of avoiding the influence of undesired background light noise level in the detection.

It is, therefore, necessary to provide an alternative to the state of the art which covers the gaps found therein, by providing a hand-held microfluidic detection device which does not possess the above-mentioned drawbacks related to the background light noise level, thus providing an enhanced in field detection.

SUMMARY OF THE INVENTION

To that end, the present invention relates to a hand-held microfluidic detection device, comprising, in a known manner:

a microfluidic cell having at least one chamber intended to at least contain a sample;

a support configured for the attachment thereto of said microfluidic cell;

excitation light means arranged at least in part in said support to side illuminate said at least one chamber of said microfluidic cell to excite said sample contained therein; and an optical detector configured and arranged to detect light emitted from said sample when excited with said side illumination.

In contrast to the devices known in the prior art, the device of the present invention comprises, in a characterizing manner, a casing constituting an envelope into which at least the above-mentioned support is housed and attached, and the support comprises a housing for removably attaching the microfluidic cell.

The device of the present invention constitutes an integrated, compact optical and fluidic system for carrying out and quantifying biological, chemical and biochemical reactions in a microfluidic device.

Said casing provides a closed environment which contributes to improve the detection, in comparison with the prior art handheld devices, by providing a dark compartment and protected from external agents for carrying out the detection process absent of parasitic interferences related to ambient external light and also to said external agents.

For an embodiment, the device of the present invention comprises a plurality of microfluidic cells removably and interchangeably attached to the support's housing.

Depending on the embodiment, the at least one chamber is a chamber for containing static samples, such as a well or reservoir, and/or a chamber for containing a sample flowing there within, such as a channel.

For a preferred embodiment, the microfluidic cell is a microfluidic flow cell where the at least one chamber is a channel for containing a sample flowing there within, wherein the support includes a fluidic manifold (or other kind of fluid distribution device) configured to fluidically communicate at least one manifold fluidic channel thereof with said at least one channel (generally several channels) when the microfluidic flow cell is attached to the support.

Preferably, the optical detector is also housed into said casing, so that the optical detector is placed within the above mentioned dark and protected compartment.

Alternatively, for less preferred embodiments, the optical detector is not housed in the casing but externally coupled to a boundary wall thereof, such that light coming from the sample impinges on the detector through an opening defined in said casing boundary wall. For these embodiments, the coupling of the optical detector to said casing boundary wall is performed such that ambient light does not enter into the casing through said through opening, using a deformable sealing gasket if necessary to provide a higher coupling tightness to ensure a gas-tight seal between the two.

For an embodiment, the optical detector is a camera or image sensor (such as CCD or CMOS camera or image sensor). In another embodiment, the optical detector is a photodiode. In another embodiment, the optical detector is an array of photodiodes. In another embodiment, the optical detector is a spectrometer.

In the device of the present invention, the optical detector is configured and arranged to detect first light rays of the light emitted from the sample (whether scattered, refracted, reflected, generated, or diffracted thereby) which depart from the sample according to one or more first emission directions going towards the optical detector.

In addition to the above-mentioned ambient light, conventionally there are other kinds of parasitic light which could arrive at the optical detector, and thus interfere in the detection, worsening its results, as they could create an undesired background noise level upon reaching the detector.

The device of the present invention also copes with said other kinds of parasitic light, by means of several embodiments, so that their negative effects on the detection results are cancelled or at least become negligible, so that the signal obtained from the optical interrogation of the removable microfluidic chip is enhanced and facilitates its quantification.

A main one of said other kinds of parasitic light is that constituted by light rays departing from the sample or from another location of the microfluidic cell according to emission directions opposed to the location of the optical detector, which could rebound off of near surfaces and be redirected towards the optical detector by undesired reflections, creating background noise and reducing the detection sensitivity.

To cope with said main kind of parasitic light, for an embodiment, the device further comprises parasitic light suppressing means configured to avoid the impingement on the optical detector of second light rays of the light emitted from the sample or from another location of the microfluidic cell, which depart therefrom according to second emission directions opposed to the above mentioned first emission directions, or to at least attenuate the intensity of said second light rays before impinging on the optical detector until a degree at which their negative effects become negligible.

Although other arrangements are embraced by embodiments of the present invention, generally the support comprises a plate with a through hole and a coupling arrangement to removable couple the microfluidic cell over said through hole (i.e., over an upper surface of said plate including said through hole) into the above mentioned housing, and the optical detector is arranged below said through hole to receive and detect the above mentioned first light rays emitted from the sample and passing through the through hole.

The support's housing assures that removable microfluidic chip is held therein ensuring the accurate alignment of its channel's openings with respect to the manifold channel's openings, for fluid transfer from one to the other, or vice versa.

For some embodiments, the support also contains further housings to hold a number of light sources, included in the excitation light means, that determine the exact position of the removable microfluidic cell with respect to them. This control over the relative position between the light sources and the removable microfluidic chip enables the illumination of the microfluidic chip channels at defined angles and specific distances from the light source, and with controlled illumination patterns.

According to an embodiment, the casing comprises a through opening defined at a wall thereof, wherein said through opening is configured and arranged to allow the introduction/extraction there through of the microfluidic cell with respect to the casing and the coupling/uncoupling thereof by said coupling arrangement.

Preferably, the device of the present invention comprises a lid for closing said casing's through opening once the microfluidic cell is introduced there through and coupled to the support by the coupling arrangement, in order to block ambient light and other external agents from entering into the dark compartment.

The removable microfluidic chip may contain samples and reagents added prior to its insertion that react with the delivered liquids. These reactions generate optically active products that can be quantified through optical detection techniques. The excitation light means excite the interior of the microfluidic chip channels in order to produce an optical signal that can be analysed by the optical detector.

In one embodiment, the removable microfluidic cell contains reagents that bind with molecules from a sample. These molecules can then react with other reagents delivered by the manifold to generate an optical signal that can be measured using the excitation light means and the optical detector. The reagents contained in the microfluidic cell may be lyophilized on its surface at specific positions. In another embodiment, the removable microfluidic cell is capable of generating a capillary flow of sample that fills the reagent-containing channels without the use of external equipment.

For an embodiment, said optical signal is a form of scattering created by metallic particles in the microfluidic chip channels. In another embodiment, this optical signal is a form of scattering created by polymeric particles or beads. In another embodiment, this optical signal is a form of scattering created by inorganic particles or beads. In another embodiment, this optical signal is a fluorescent response created by liquids in the microfluidic chip channels. In another embodiment, this optical signal is a fluorescent response created by fluorescent particles, beads or plasmonic resonance.

For an embodiment, the positioning between the light sources and the removable microfluidic chip induces a light coupling phenomenon.

For an implementation of said embodiment, thanks to the precise positioning and short distance (tens of micrometres) between each light source and the removable microfluidic chip, light from the light source is coupled to the substrate/plate thereof and directed toward the sample contained in the microfluidic channels.

Upon illumination, generally, the sample emits light isotropically, part of it (the above mentioned first light rays) reaching the optical detector directly. Light emitted by the sample in other directions could rebound off of near surfaces and reach the detector, creating background noise and reducing the sensitivity of the system, The combination of these light blocking functions results in a very low background noise level that in turns allows for highly sensitive measurements. Furthermore, the integration of these light blocking functions into the fluidic system enables a very compact design, with global dimensions in the range of tens of millimetres, of high interest for the development of handheld point-of-care instrumentation.

For another embodiment, the removable microfluidic chip acts as a waveguide for light from the light sources.

For an embodiment, the microfluidic cell is a microfluidic chip having a translucent plate with first and second opposite major surfaces sandwiching the at least one channel, wherein when the microfluidic chip is attached to the support said first major surface faces the optical detector, and wherein the parasitic light suppressing means comprises at least a first deflection arrangement configured to deflect the second light rays once they have output said translucent plate through said second major face so that they either not impinge on the optical detector or their intensity is attenuated before impinging on the optical detector so their negative effects become negligible.

According to an embodiment, the parasitic light suppressing means further comprises a second deflection arrangement configured to deflect the second light rays once they have been deflected by the above mentioned first deflection arrangement.

The above mentioned first deflection arrangement comprises, for an embodiment, one or more first deflection walls arranged over the second major surface of the translucent plate of the microfluidic chip and extending orthogonally with respect to said second major surface, whether perpendicularly thereto or divergently from first ends up to second ends, said first deflection wall(s) forming an arrangement which encloses a volume over a portion of said second major surface, such that the second light rays departing from said portion of the second major face are deflected upwards by the inner surfaces of the first deflection wall(s).

Alternatively, the first deflection wall(s) extend from an upper surface of the support's plate.

Although other arrangements are embraced by embodiments of the present invention, generally the support comprises a plate with a through hole and a coupling arrangement to removable couple the microfluidic cell over said through hole, and the optical detector is arranged below said through hole to receive and detect the above mentioned first light rays emitted from the sample and passing through the trough hole.

Regarding the second deflection arrangement, according to an embodiment it comprises one or more second deflection walls extending convergently towards the second major surface of the translucent plate of the microfluidic chip from first ends, placed at a plane arranged over the second ends of the first deflection walls, up to second ends.

For some embodiments, the one first deflection wall of the first deflection arrangement forms a hollow truncated cone, i.e. the one first deflection wall is a conical wall, while for other embodiments the one first deflection wall of the first deflection arrangement is one cylindrical wall that forms a hollow cylinder.

Obviously, each of said conical and cylindrical walls is not formed by several walls but by only one wall of revolution, i.e. a wall having a surface of revolution.

For other embodiments, the first deflection walls of the first deflection arrangement form a hollow truncated pyramid.

The one second deflection wall of the second deflection arrangement form one of a cone and a convex curved cap (such as a spherical cap or an ellipsoidal cap), for different embodiments. I.e., that one second deflection wall is a wall of revolution.

For other embodiments, the second deflection walls of the second deflection arrangement form a pyramid.

For some embodiments, two second deflection walls of the second deflection arrangement converge, at their second ends, into a longitudinal edge. That's the case, for example, when said two second deflection walls correspond to two sides of a triangular prism, or a prism similar to a triangular prism but which triangular bases are not parallel to each other. The other side of such a prism would be defined by the above mentioned plane from which the second deflection walls extend.

According to an implementation of said embodiments, a projection of the above mentioned longitudinal edge on the second major surface of the translucent plate of the microfluidic chip follows a direction that is orthogonal or substantially orthogonal (orthogonal with a tolerance of ±10%) to a main illumination plane of the side illumination.

Preferably, a longitudinal axis of the at least one channel of the microfluidic chip, when the microfluidic chip is attached to the support, occupies said main illumination plane.

As stated above, usually, the microfluidic chip comprises several channels, some of them being configured and arranged so that a longitudinal axis thereof, when the microfluidic chip is attached to the support, occupies respective illumination planes that are parallel to the main illumination plane and orthogonal or substantially orthogonal to the projection of the longitudinal edge.

Preferably, the longitudinal edge belongs to a plane that is parallel or substantially parallel (parallel with a tolerance of ±10%) to the second major surface of the translucent plate of the microfluidic chip, when the microfluidic chip is attached to the support.

The terms "main illumination plane" refer herein to an illumination plane including a preferred axis/plane of illumination. Therefore, by the above arrangement of the longitudinal edge, and the projection thereof, a preferred axis/plane of light trapping is achieved.

In other words, as channels of the microfluidic chip define a preferred direction, illumination is also arranged in a preferred direction, and then the above mentioned embodiments of the light trap also reflects this specificity, by including and arranging a longitudinal edge within a preferred direction.

For an embodiment, the casing comprises a top portion having a region which defines the above mentioned plane at which the first ends of the one or more second deflection walls are placed.

For an alternative embodiment, the device of the present invention further comprises a cover element arranged over the first deflection wall(s) to cover the volume enclosed thereby.

Said cover element comprises said one or more second deflection walls and a top portion having a lower surface defining said plane, wherein some regions of said top portion lower surface lay on the second end(s) of the first deflection wall(s), said regions surrounding the second deflection wall(s), and the second deflection wall(s) occupying at part of said volume enclosed by the first deflection wall(s).

Other of said kinds of parasitic light is that emitted by the excitation light means that does not enter into the microfluidic cell, whether directly from a light source or through an optical element optically coupled thereto (such as an optical fibre).

For an embodiment, the device of the present invention comprises further parasitic light suppressing means configured to avoid the impingement on the optical detector of third light rays of said light emitted by the excitation light means that does not enter into the microfluidic cell, whether departing from the excitation light means according to the above mentioned first emission directions or according to the second emission directions.

Depending on the embodiment, said further parasitic light suppressing means include light blocking elements (such as a dark paint layer applied over some regions of the light source) and/or light deflection elements. For an implementation of said embodiment, said light deflection elements are the above mentioned first deflection wall(s), specifically the external surface thereof.

Depending on the embodiment, the device of the present inventions comprises both of said parasitic light suppressing means and further parasitic light suppressing means, or only one of any of them.

For another embodiment, the device of the present invention further comprises a light blocking element configured to block the impingement on the optical detector of any possible parasitic light ray which has not been suppressed by the above mentioned parasitic light suppressing means and further parasitic light suppressing means, or that could have entered into the dark compartment enclosed by the casing.

For an embodiment, said light blocking element is a tubular light blocking element extending from a lower surface of the support's plate surrounding its through hole, and having a lower open end into which the optical detector is arranged such that it receives the first light rays going through the interior of the tubular light blocking element.

The combination of the above described light suppressing and light blocking functions results in a very low background noise level that in turns allows for highly sensitive measurements. Furthermore, the integration of these light blocking functions into the device of the present invention enables a very compact design of the device, with global dimensions in the range of tens of millimetres (for each of the X, Y, and Z dimensions), of high interest for the development of handheld point-of-care instrumentation.

The device of the present invention further comprises, for some embodiment, an electric and electronic system operatively connected to the optical detector, to power the same and control the operation thereof and also to receive and process detection signals generated thereby to perform optical measurements, to the excitation light means, to power the same and control the operation thereof (providing desired controlled illumination patterns), and to a user interface included in the device which includes at least user input means and a display to control the operation of the device by a user and display at least graphical information related to said optical measurements.

For an embodiment, the user input means and the display are implemented by means of a touch screen.

According to an embodiment, the support further comprises liquid and pneumatic connectors for liquid delivery and collection to/from the at least one manifold fluidic channel, wherein said connectors are accessible from outside the casing to removable couple thereto at least one of the following components: liquid and/or gas reservoirs, external pumps, valves, and actuators.

Each of said liquid and/or gas reservoirs constitute a further independent aspect which could form another invention.

Said pumps, valves, and/or actuators are preferably controlled by the above mentioned electric and electronic system, through respective wired or wireless paths.

According to an embodiment, the excitation light means comprises at least one light generating unit (such as a LED, a laser, a light bulb, etc.), for generating monochromatic and/or polychromatic light, wherein said light generating unit and/or an optical element directing light generated thereby is/are attached to the support such that a light beam generated by the light generating unit goes towards a respective side edge of the plate of the microfluidic chip, whether with an optical axis which is orthogonal to said side edge or with an optical axis which is transversal but not orthogonal to said side edge and has an emission direction away from the optical detector.

For an embodiment, the device of the present invention further comprises a deformable sealing gasket placed between the microfluidic chip and the support to ensure a gas-tight seal between the two.

For an implementation of said embodiment, the deformable sealing gasket comprises two or more O-rings interconnected through a film frame, thinner than the two or more O-rings, so that each of the two or more O-rings is configured and arranged to be positioned, when the microfluidic chip is attached to the support, in correspondence with a respective opening of the channel(s) of the microfluidic chip and a respective opening of the manifold fluidic channel(s), wherein the film frame defines a central through-opening configured and arranged to be in correspondence with the through hole of the plate of the support.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

Figure 1:
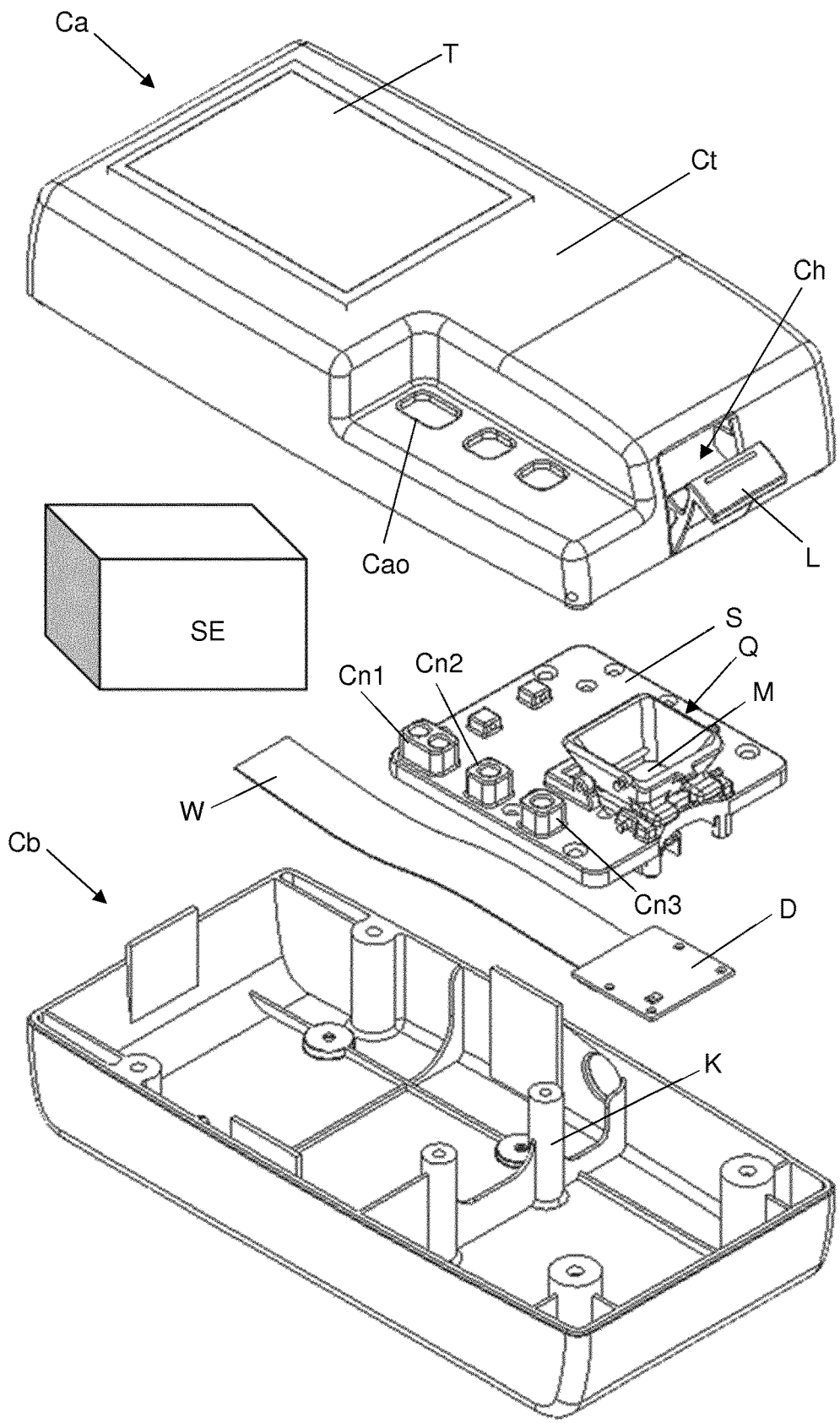
FIG. 1 is an exploded and schematic perspective view of the device of the present invention, for an embodiment.
Figure 2:
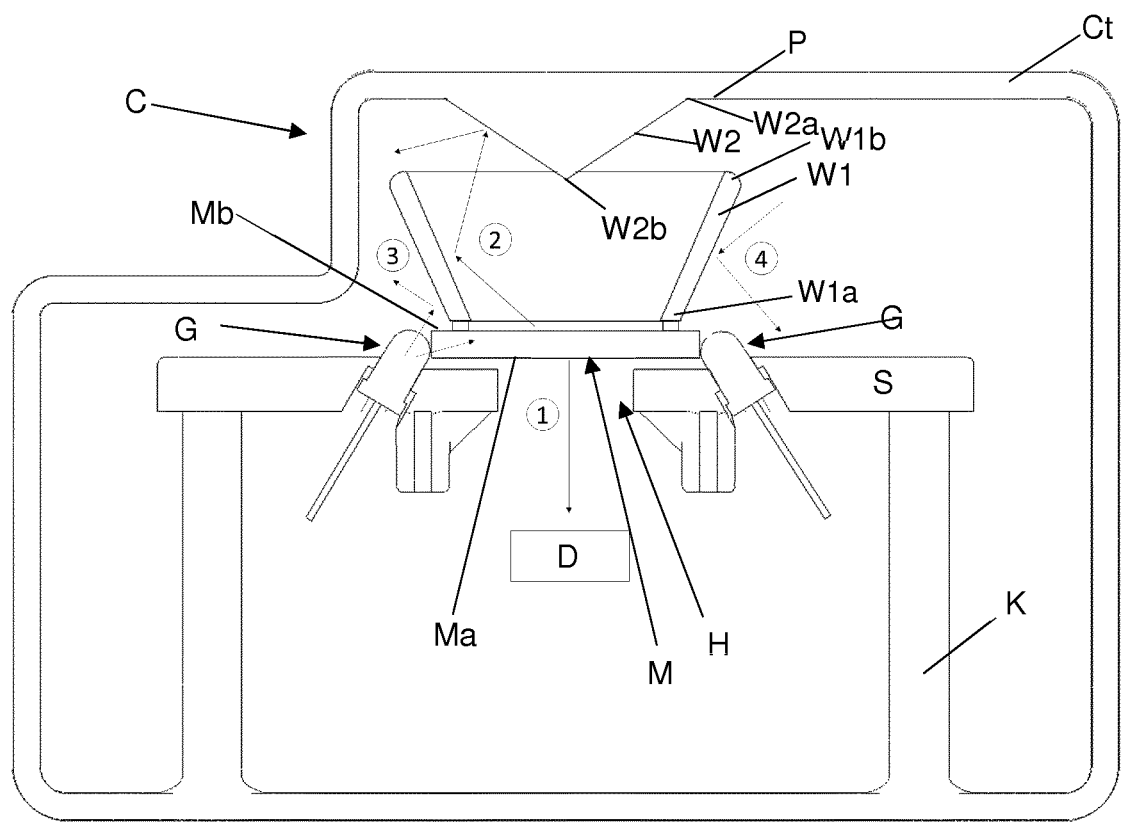
FIG. 2 is a cross-section view which schematically shows the device of the present invention, for another embodiment, including the casing and some of the elements placed within the casing.

As shown in FIGS. 1 and 2, the hand-held microfluidic detection device of the present invention comprises a casing C constituting an envelope and the following components housed within the casing C:

a microfluidic cell M, which for the illustrated embodiments is a microfluidic chip M comprising inner channels Mc (see FIG. 5) for the containing and flow of a sample;

a support S comprising a housing for removably attaching thereto the microfluidic chip M;

excitation light means comprising LEDs G arranged in the support S tilted upwardly to side illuminate the inner channels Mc of the microfluidic chip M to excite the sample contained therein;

an optical detector D (schematically shown in FIG. 2) configured and arranged to detect light emitted from said sample(s) when excited with the side illumination; and an electric and electronic system ES (schematically shown in FIG. 1) operatively connected to the optical detector D (through a flat cable, for the illustrated embodiment), to power the same and control the operation thereof and also to receive and process detection signals generated thereby to perform optical measurements, to the excitation light means, to power the same and control the operation thereof, and to a user interface included in the device which includes a touch screen T to control the operation of the device by a user and display graphical information related to the optical measurements.

For the embodiment shown in FIG. 1, the casing C is formed by two casing halves Ca, Cb, attachable to each other to form the above mentioned enclosure.

Figure 4:
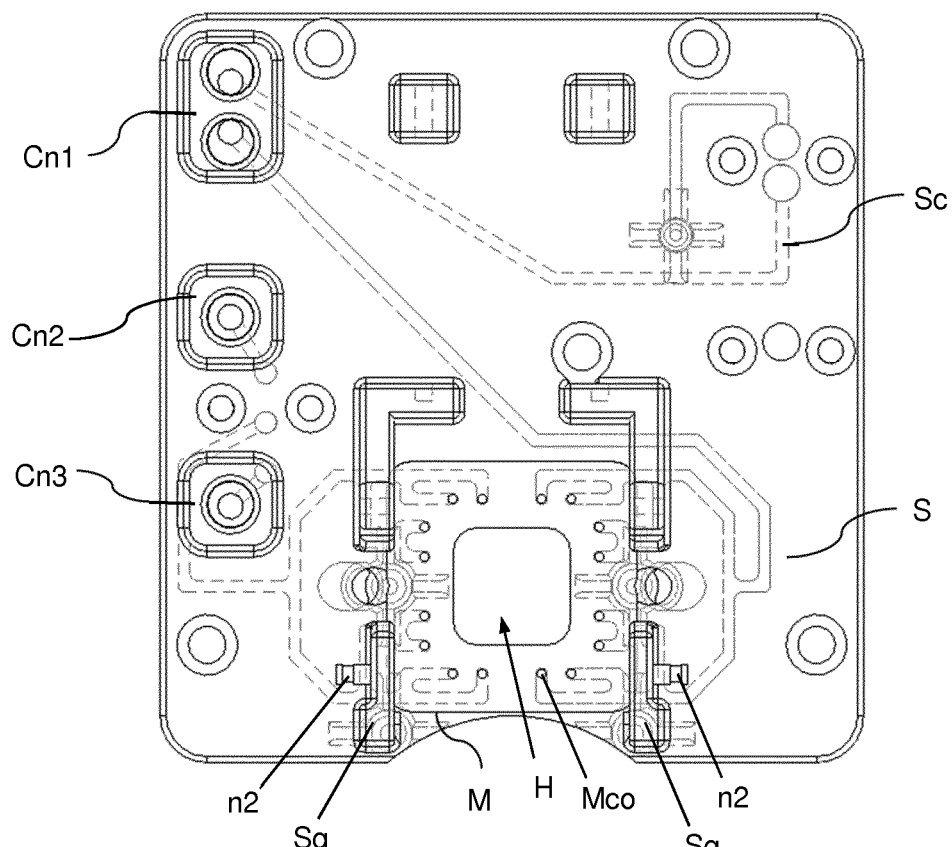
FIG. 4 is a top view of the support/manifold of the device of the present invention with a microfluidic chip coupled to the housing included therein, for an embodiment.

The support S is housed within the casing C and also attached to a structural inner element thereof, such as pillars K, for the illustrated embodiments, and, as shown in FIG. 4, includes a fluidic manifold configured to fluidically communicate manifold fluidic channels Sc thereof with the inner channels Mc when the microfluidic chip M is attached to the support S.

As shown, among other, in FIGS. 2 and 4, the support S comprises a plate with a through hole H and a coupling arrangement to removable couple the microfluidic chip M over the through hole H.

Figure 5:
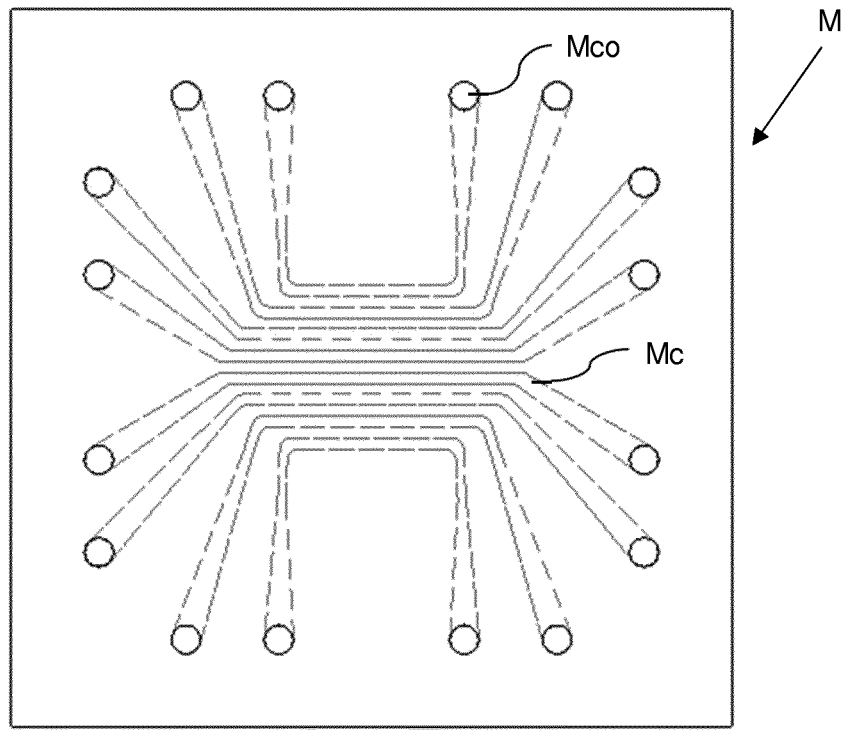
FIG. 5 is a top view which shows the microfluidic chip of the device of the present invention, for an embodiment.

The microfluidic chip M is depicted in detail in FIG. 5, and has a translucent plate with first Ma and second Mb opposite major surfaces (see FIG. 2) sandwiching the inner channels Mc which are communicated with the exterior thereof through respective end openings Mco, all of them simultaneously coincide with respective manifold channels openings Sco (i.e. spatially aligned) when the microfluidic chip M is attached to the support S, as shown in FIG. 4 (where due to the translucency of chip M, the elements placed below can be seen), so that the inner channels Mc are communicated with the manifold channels Sc.

With reference to FIG. 2, different light rays are depicted, one of them are first light rays 1, which are of interest for the detection, and are emitted from the sample (whether scattered, refracted, reflected, generated, or diffracted thereby) which depart from the sample according to one or more first emission directions going towards the optical detector D and pass through the trough hole H.

As shown in FIG. 2, when the microfluidic chip M is attached to the support S the first major surface Ma faces the optical detector D, and the optical detector D is arranged below through hole H to receive and detect said first light rays 1.

The rest of the above mentioned light rays depicted on FIG. 2, are second 2, third 3, and four 4 parasitic light rays.

As already disclosed in a previous section, the device of the present invention comprises light suppressing means for avoiding the impinging of said parasitic light rays 2, 3, 4 on the optical detector D, or at least attenuating them before impinging on the optical detector D until a degree at which their negative effects become negligible.

For the illustrated embodiments (see FIGS. 2, 3, 6, 8, 9, 10, and 11), the device comprises parasitic light suppressing means configured to avoid the impingement on the optical detector D of the second light rays 2 of the light emitted from the sample or from another location of the microfluidic cell, which depart therefrom according to second emission directions opposed to sad first emission directions, or to at least attenuate the intensity of said second light rays 2 before impinging on the optical detector D.

Said parasitic light suppressing means comprises a first deflection arrangement configured to deflect the second light rays 2 once they have output said translucent plate through the second major face Mb so that they either not impinge on the optical detector D or their intensity is attenuated before impinging on the optical detector D.

Figure 10:
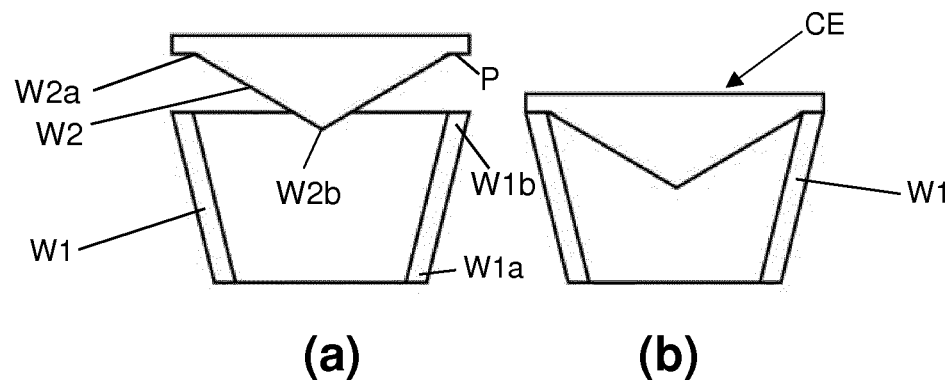
FIG. 10 schematically shows an embodiment of the first and second deflection walls of the device of the present invention, including a cover element which comprises the second deflection walls; (a) shows a situation at which the cover element is distanced form the first deflection walls, which extend divergently upwards; and (b) shows a situation at which the cover element lays on the first deflection walls and covers the volume enclosed thereby.

The first deflection arrangement comprises, for the illustrated embodiments, several first deflection walls W1 (particularly four) arranged over the second major surface Mb of the translucent plate of the microfluidic chip M and extending orthogonally with respect to the second major surface Mb of the translucent from first ends W1*a* up to second ends W1*b* (see especially FIGS. 2 and 10).

For most of the depicted embodiments, the first deflection walls W1 extend divergently with respect to the second major surface Mb to form a hollow truncated pyramid which encloses a volume over a portion of the second major surface Mb, the second light rays 2 departing from said portion of the second major face Mb being deflected upwards by the inner surfaces of the first deflection walls W1, as represented by the light rays 2 in FIG. 2.

Figure 11:
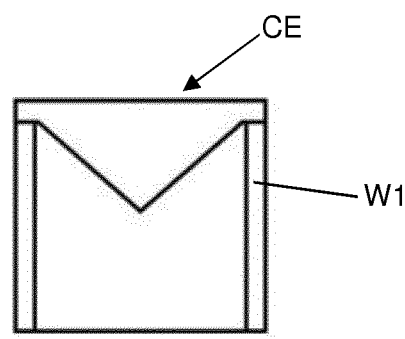
FIG. 11 is a view similar to that of FIG. 10(*b*), but differing therefrom in that the first deflection walls extend vertically upwards.

Alternatively, for the embodiment illustrated in FIG. 11, the first deflection walls W1 extend perpendicularly with respect to the second major surface Mb, forming a hollow rectangular prism (such as a cuboid) or a hollow cylinder, which also encloses a volume over a portion of the second major surface Mb, and which inner surfaces also deflect light rays 2, but with an angle different the one shown in FIG. 2.

For the illustrated embodiments, the parasitic light suppressing means further comprises a second deflection arrangement configured to deflect the second light rays 2 once they have been deflected by the first deflection arrangement.

As shown in FIGS. 2, 10, and 11, the second deflection arrangement comprises one or more second deflection walls W2 extending convergently towards the second major surface Mb of the translucent plate of the microfluidic chip M from first ends W2*a*, placed at a plane P arranged over the second ends W1*b* of the first deflection walls W1, up to second ends W2*b*. As shown in FIG. 2, the light rays deflected by the inner surface of first deflection walls W1 are further deflected by the second deflection wall(s) W2.

The wall or walls W2 (a cross-section of which is shown in FIGS. 2, 10 and 11) of the second deflection arrangement form one of a cone, a pyramid, and a convex curved cap, for some embodiments.

Figure 14:
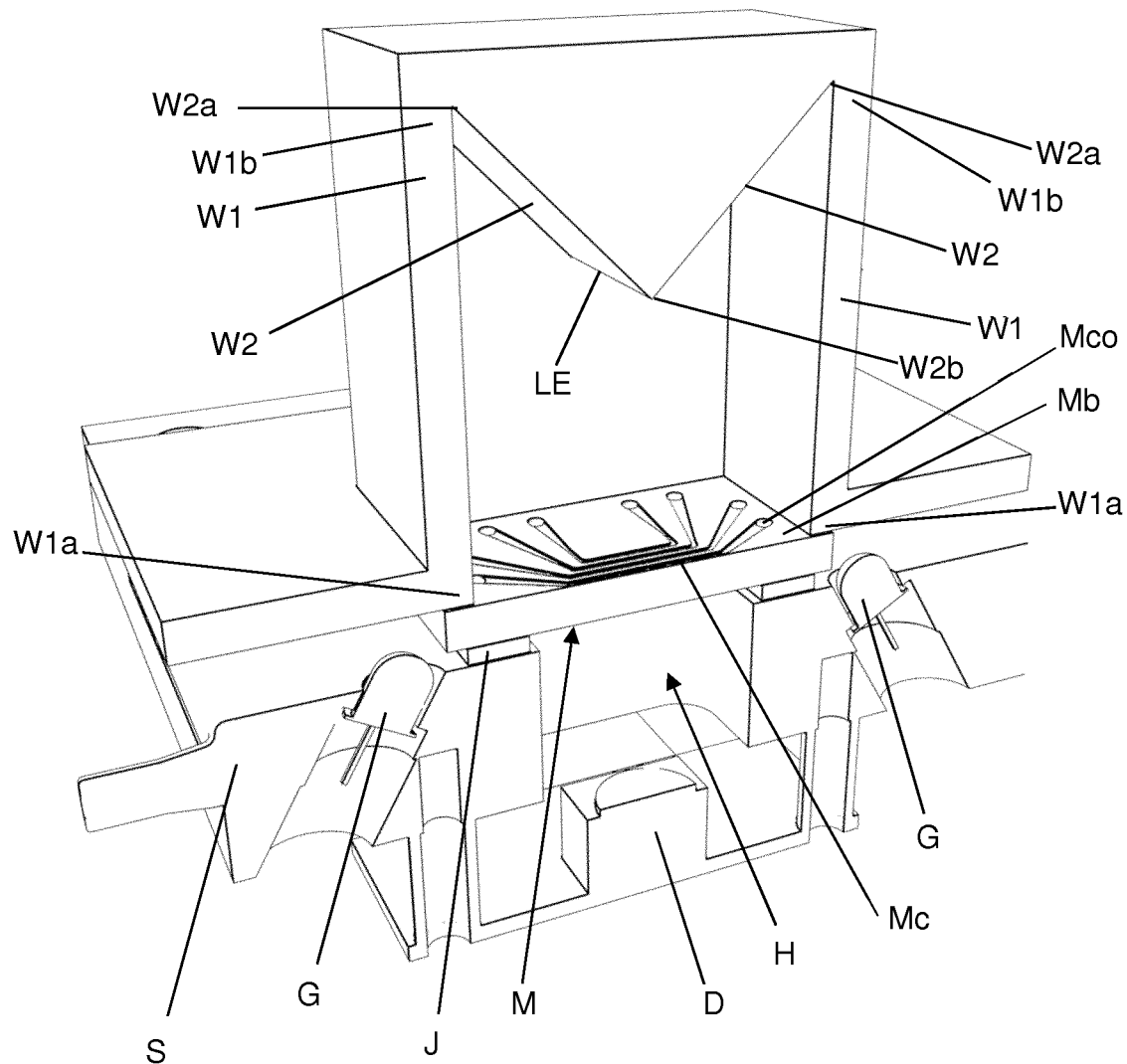
FIG. 14 is a cross-section of a perspective view of part of the device of the present invention, for an embodiment, obtained along a cutting plane that coincides with a main illumination plane that passes through the centre axes of the light sources, and where two second deflection walls correspond to two sides of a triangular prism and converge into a longitudinal edge.

For other embodiments, the wall or walls W2 converge, at their second ends W2b, into a longitudinal edge LE, as shown in FIG. 14, where two second deflection walls W2 correspond to two sides of a triangular prism and converge into a longitudinal edge LE.

As shown in FIG. 14, the main illumination plane (that coincides with the cutting plane used to obtain the illustrated cross-section view) is orthogonal (or substantially orthogonal) to a projection of the longitudinal edge LE on the second major surface Mb of the translucent plate of the microfluidic chip M, and specifically, for the illustrated embodiment, orthogonal to the longitudinal edge LE, as the latter belongs to a plane that is parallel or substantially parallel to the second major surface Mb of the translucent plate.

FIG. 14 also shows how one of the microfluidic channels Mc has a longitudinal axis, or flow path, that occupies the main illumination plane, and thus is also orthogonal at least to the projection of the longitudinal edge LE, and preferably to the longitudinal edge LE itself.

The rest of microfluidic channels Mc are arranged so that their respective longitudinal axes, or flow paths, occupy respective illumination planes that are parallel to the main illumination plane.

For the embodiment of FIG. 14, the first W1 and second W2 deflection walls have been illustrated forming an integral single piece. However, a slight variation of the illustrated embodiment, includes the first W1 and second W2 deflection walls into two separate pieces that are coupled to each other, similarly to what is shown in FIGS. 10 and 11, i.e. by means of a cover element having the second deflection walls W2 and arranged over the first deflection walls W1.

For the embodiment shown in FIG. 2, the casing C comprises a top portion Ct having a region which defines plane P at which the first ends W2a of the one or more second deflection walls W2 are placed, and the light rays deflected by the inner surface of first deflection walls W1 are further deflected by the second deflection wall(s) W2 away from the microfluidic chip M.

For some embodiments, the orthogonal distance between said region of the top portion Ct defining said plane P and the major surface Mb of the translucent plate of the microfluidic chip M goes from 2 cm up to 8 cm, preferably up to 5 cm.

Alternatively, for the embodiments shown in FIGS. 10 and 11, the device of the present invention further comprises a cover element CE arranged over the first deflection walls W1 to cover the volume enclosed thereby, and said cover element CE comprises the one or more second deflection walls W2 and a top portion having a lower surface defining said plane P, wherein, in use (see FIGS. 10(b) and 11), some regions of said top portion lower surface lay on the second ends W1b of the first deflection walls W1, said regions surrounding the second deflection wall(s) W2, and the second deflection wall(s) W2 occupying part of the volume enclosed by the first deflection walls W1.

By comparing FIGS. 10(b) and 11, one can see that for the illustrated cross-sections the angle between the components of each pair of opposite first W1 and second W2 deflection walls is substantially the same for both embodiments, and calculated so that light rays 2 deflected by the inner surface of first deflection walls W1 are further deflected by the second deflection wall(s) W2, and in this case (in contrast to the embodiment of FIG. 2) go back to the first deflection walls W1 and come back therefrom a number of times, so that the light intensity thereof is highly attenuated.

Preferably, the deflection surfaces of both the first W1 and the second W2 deflection walls are dark in order to absorb light.

As shown in FIG. 2, third parasitic light rays 3 depart from LEDs G. In order to suppress, or at least attenuate said third parasitic light rays 3, light deflection elements are arranged to deflect said rays 3 to avoid the impingement thereof on the optical detector D. For the illustrated embodiment, said light deflection elements are implemented by the external surface(s) of some of the first deflection walls W1, which can be parallel to the inner surfaces thereof (as illustrated) or not. For a non-illustrated embodiment, the light deflection elements are implemented by walls which are not the first deflection walls W1. FIG. 2 also shows how four parasitic light rays 4 could have entered into the casing C from the exterior thereof, and that in order to suppress, or at least attenuate said four parasitic light rays 4, light deflection elements are arranged to deflect said rays 4 to avoid the impingement thereof on the optical detector D. For the illustrated embodiment, said light deflection elements are implemented also by the external surface(s) of some others of the first deflection walls W1.

Figure 3:
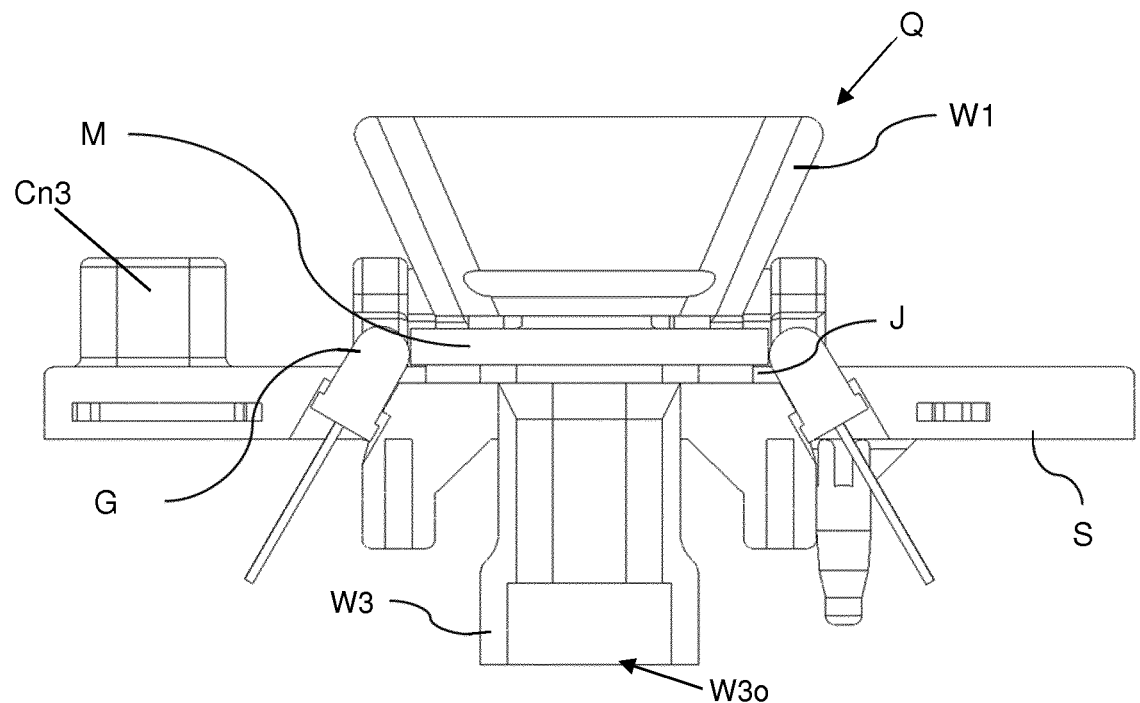
FIG. 3 is a further cross-section view which schematically shows part of the device of the present invention, for another embodiment, illustrating particularly the microfluidic chip, the support including the manifold, two LEDs, a light blocking element, and some of the light suppressing arrangements.

For another embodiment, shown in FIG. 3, the device of the present invention further comprises a tubular light blocking element W3 extending from a lower surface of the support's plate surrounding its through hole H, and having a lower open end W3o into which the optical detector D (not shown in FIG. 3) is to be arranged such that it receives the first light rays 1 going through the interior of the tubular light blocking element.

Said tubular light blocking element W3 is configured to block the impingement on the optical detector D of any possible parasitic light ray which has not been suppressed by the above mentioned parasitic light suppressing means and further parasitic light suppressing means, or that could have entered into the dark compartment enclosed by the casing C.

Figure 8:
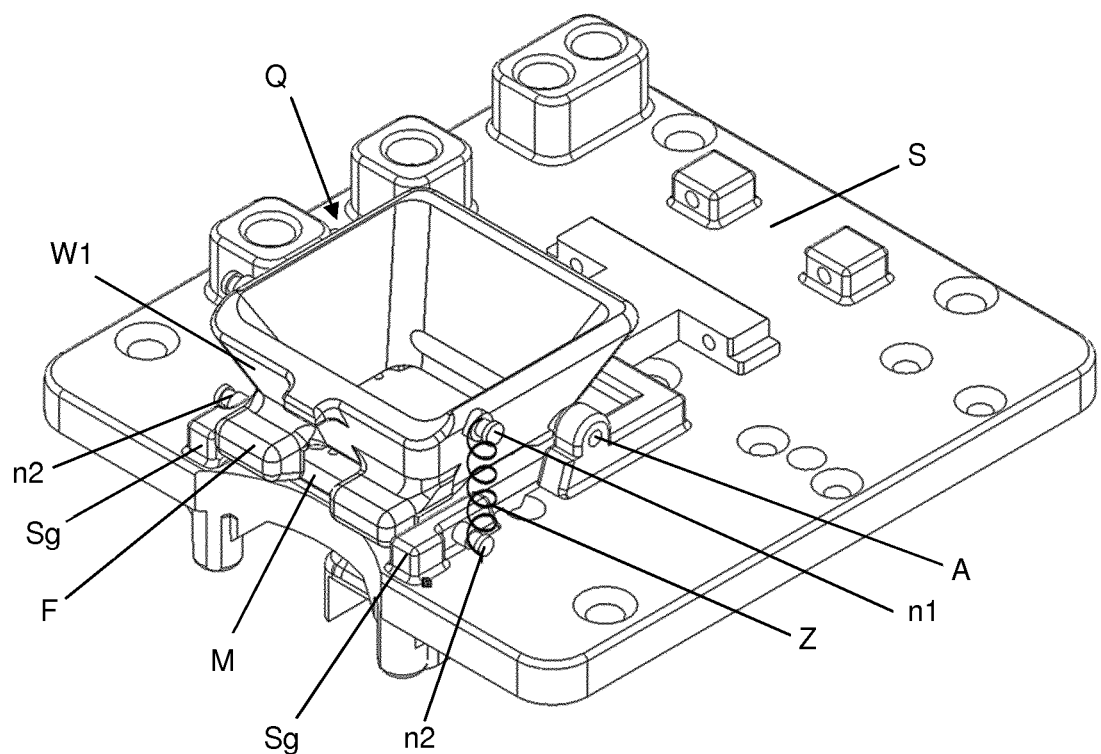
FIGS. 8 and 9 are perspective views similar to that of FIG. 6 (without the reservoirs), and including a spring mechanically linking the support and one of the first deflection walls which form part of a kind of cup which constitutes the housing and coupling arrangement for the introduction/extraction and coupling/uncoupling of the microfluidic chip thereto, FIG. 8 showing a situation where the microfluidic chip is introduced in the housing and coupled to the support, and FIG. 9 an intermediate situation representing the introduction or extraction of the microfluidic chip.
Figure 9:
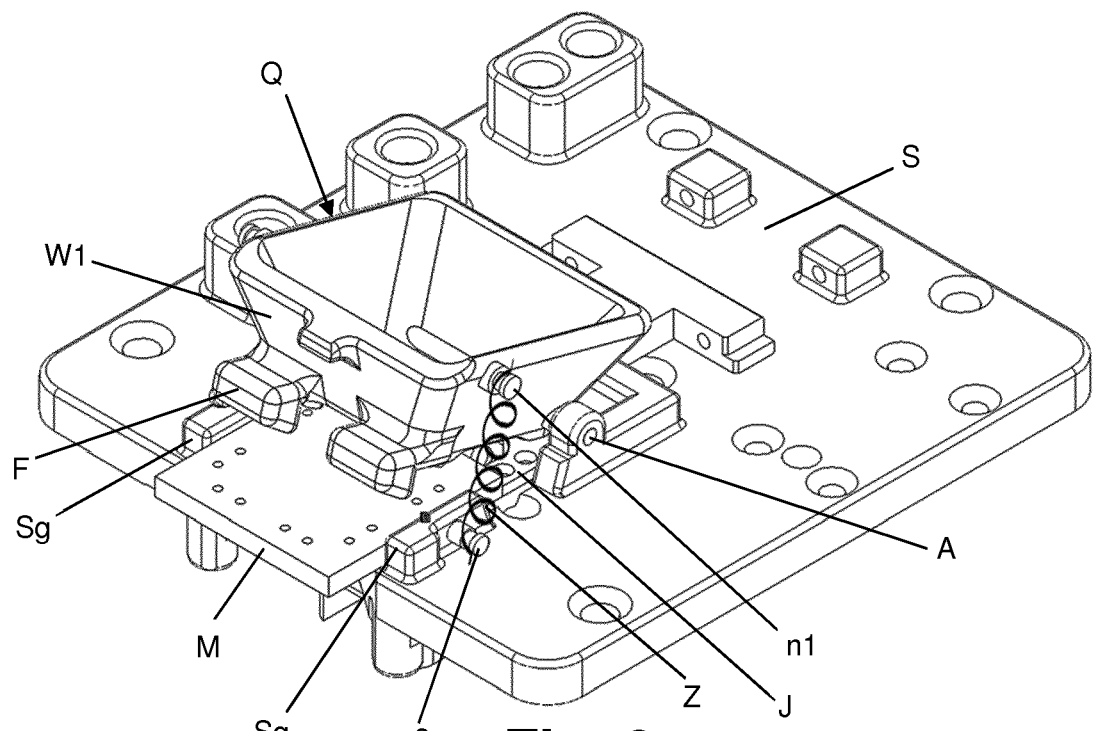

With reference now to FIGS. 8 and 9, they show how the first deflection walls W1 are integrated into a cup element Q which also includes front retaining fingers F (implementing the above mentioned coupling arrangement to removable couple the microfluidic chip M over the through hole H) and two pins n1 (only one of them can be seen in the figures, because the other is hidden by the cup element Q) extending from opposite first deflection walls W1. Said pins n1 are linked to respective pins n2 of the support S by respective springs Z. A back portion of the cup element is articulated to the support S, at articulation A, so that the cup element Q rotates there about.

By releasing the retaining fingers F from a position at which they are coupled to the support S, the cup element Q pivots about articulation A up to an angular end position at which the springs Z are fully extended, as shown in FIG. 9, so that the above mentioned housing is defined between the cup element Q and the region of the plate of the support S surrounding the through hole H. Said region is side demarcated by guide frame elements Sg (from which the above mentioned pins n2 extend) which allow a guided introduction/extraction of the microfluidic chip M into said housing, as shown in FIG. 9.

By pushing the microfluidic chip M further into the housing than the situation shown in FIG. 9, the chip M is properly placed at the right place (at which channels opening Mco are place just above channels openings Sco, so that channels Sc and channels Mc are communicated with each other), after having pushed upwards the back portion of the cup element Q, during the introduction displacement, such that the front portion thereof descends up to a position at which fingers F retain the microfluidic chip M in the support's housing, by the front end of the translucent plate thereof, as illustrated in FIG. 8.

As shown in FIG. 8, a deformable sealing gasket J is placed between the microfluidic chip M and the support S to ensure a gas-tight seal between the two. In this embodiment, the cup element Q exerts pressure onto the removable microfluidic chip M in order to deform the gasket J and generate a pneumatic seal.

Figure 13:
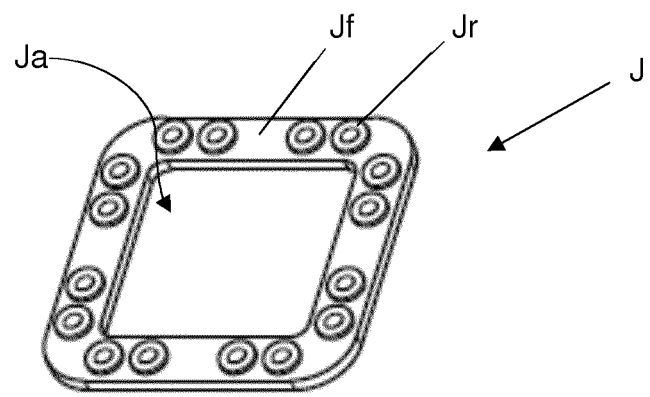
FIG. 13 shows an embodiment of a deformable sealing gasket to be placed between the microfluidic chip and the support of the device of the present invention.

An alternative embodiment for said deformable sealing gasket J is shown in FIG. 13, where the seal J comprises several O-rings Jr interconnected through a thin film frame Jf, thinner than the O-rings Jr, so that each of O-rings Jr is configured and arranged to be positioned, when the microfluidic chip M is attached to the support S, in correspondence with a respective opening Mco of the channels Mc of the microfluidic chip M and a respective opening Sco of the manifold fluidic channels Sc. As shown in the figure, the film frame Jf defines a central through-opening Ja configured and arranged to be in correspondence with the through hole H of the plate of the support S.

The deformable sealing gasket J of FIG. 13 ensures that all the O-rings Jr are positioned in one step in a correct and precise positioning, including the benefits of the use of individual O-rings to avoid leaks, that provide a small contact surface as to allow a good sealing without having to apply important mechanical pressure on it (compared to a flat gasket of the same dimension than the chip for example), while doing without with the drawbacks that the use of individual O-rings has when the microfluidic chip has an important number of ports (i.e. of openings Mco) that are of very small dimensions, so are the dimensions of the O-rings, and when the O-rings positions may not be conserved correctly when removing the chip after use, reasons that make ensuring the sealing a complex task. Those drawbacks are solved by the inclusion of the above mentioned film frame Jf interconnecting the O-rings Jr.

Both the support's housing and the coupling arrangement can be different to the ones illustrated for non-illustrated embodiments.

Going back to FIG. 1, there is shown a through opening Ch defined at a wall of the casing C, particularly of casing half Ca, wherein said through opening Ch is configured and arranged to allow the introduction/extraction there through of the microfluidic chip M with respect to the casing C and the coupling/uncoupling thereof by the coupling arrangement, as described above.

FIG. 1 also shows how the device of the present invention also comprises a lid L for closing casing's through opening Ch once the microfluidic chip M is introduced there through and coupled to the support S by the coupling arrangement, in order to block ambient light and other external agents from entering into the dark compartment enclosed by the casing C.

Figure 6:
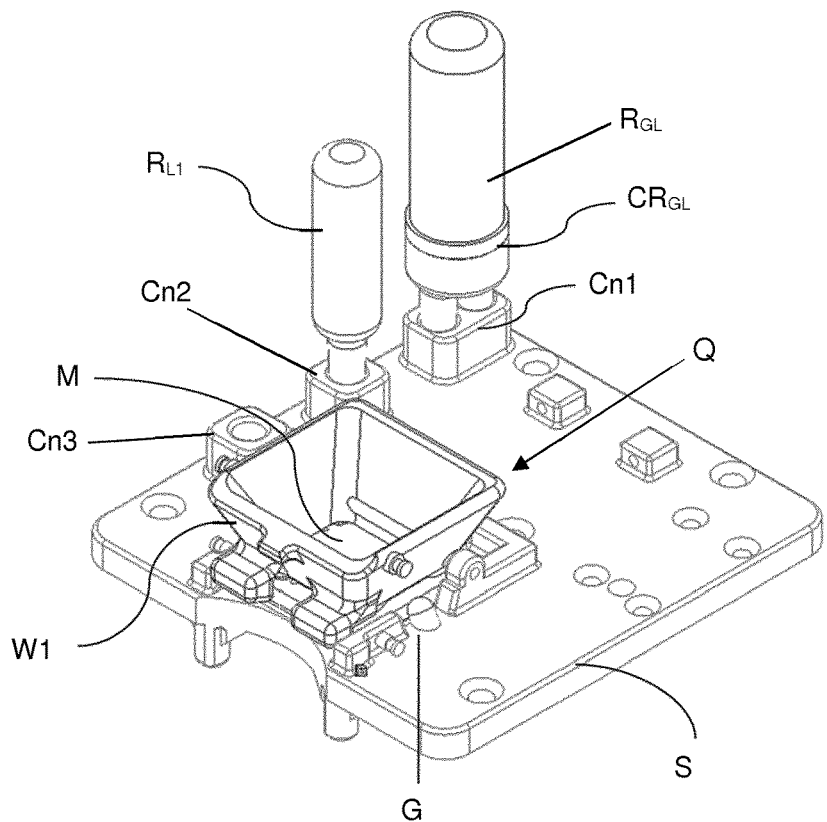
FIG. 6 is a perspective view which shows part of the elements of the device of the present invention, for an embodiment, including the support/manifold, housing and coupling arrangement, microfluidic chip, first deflection walls, LEDs, connectors, and liquid and liquid/gas reservoirs connected to some of the connectors.

FIGS. 2, 4, and 6, show how the support S of the device of the present invention further comprises, for the illustrated embodiments, liquid and pneumatic connectors/ports Cn1, Cn2, Cn3 for liquid delivery and collection to/from the at least one manifold fluidic channel, wherein said connectors Cn1, Cn2, Cn3 are accessible from outside the casing C through respective through openings Cao (see FIG. 1), to removable couple thereto at least one of the following components: liquid and/or gas reservoirs $R_{GL}$, $R_L$, external pumps and actuators.

Figure 7:
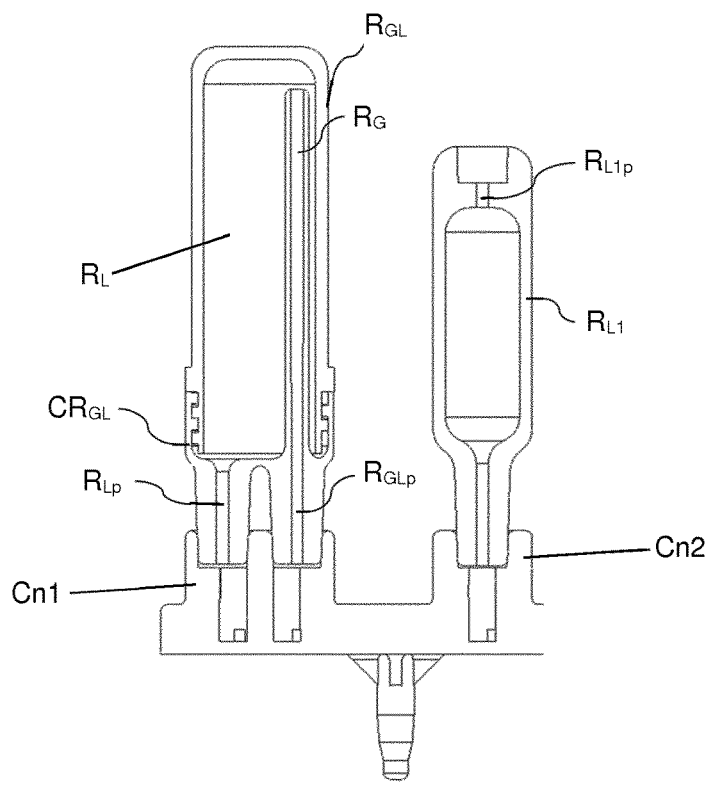
FIG. 7 is a cross-section view of part of the elements depicted in FIG. 6, showing the interior of liquid and liquid/gas reservoirs.

FIGS. 6 and 7 show one of said liquid reservoirs $R_{L1}$ and one of said liquid/gas reservoirs $R_{GL}$ respectively coupled to connectors Cn2 and Cn1. Each of said liquid reservoir $R_{L1}$ and liquid/gas reservoir $R_{GL}$ constitute a further independent aspect which could form another invention.

Particularly, connector Cn1 comprises a liquid and a gas port enabling the pneumatic control of liquid transfer from the manifold to the removable microfluidic chip M and the collection of liquid therefrom in a closed and gastight container $R_{GL}$ when attached thereto through intermediate connector combined liquid-gas connector $CR_{GL}$. The gastight container $R_{GL}$ comprises liquid reservoir $R_L$ and gas conduct $R_G$ (for the pneumatic control of the liquid transfer), having corresponding lower output channels $R_{Lp}$, $R_{GLp}$ through which they are communicated with the manifold channels Sc. This feature of this connector Cn1 container $R_{GL}$ assembly is very important in many tests to safely dispose of biological samples and reagents after use.

Regarding said liquid reservoirs $R_{L1}$, for example for containing reagents, they can be connected to liquid ports Cn2, Cn3, for delivery to the manifold channels Sc and finally to the microfluidic chip channels Mc.

For the embodiment shown in FIG. 7, the liquid reservoir $R_{L1}$ has a connection head that fits into liquid port Cn2 and a vent hole $R_{L1p}$ on their opposite side. This vent hole $R_{L1p}$ allows for gas flow into the reservoir $R_{L1}$ if the liquid is aspirated through the application of a negative pressure. It also allows the application of a positive gas pressure that can force liquid flow into the manifold channels Sc.

For a non-illustrated embodiment, an external liquid valve is attached to the manifold in order to select which liquid to flow into the channels Mc of the removable microfluidic chip M from a selection of several reservoirs or input channels. In another non-illustrated embodiment, a liquid valve is embedded in the manifold. In another non-illustrated embodiment, a liquid pumping element is directly attached to or built into the manifold.

In another non-illustrated embodiment, an external pneumatic valve is attached to the manifold in order to connect a gas channel Sc to a variety of other gas channels Sc that may be pressurized at different positive or negative pressures. In another non-illustrated embodiment, a pneumatic valve is embedded in the manifold. In another non-illustrated embodiment, a gas-pumping element is directly attached to or built into the manifold.

In one embodiment, the light source is one light-emitting diode (LED). In another embodiment, the light sources are two LEDs placed on either side of the removable microfluidic component. In another embodiment, the light source is at least one laser. In another embodiment, the light source is at least one optical fibre. In another embodiment, the light source is a reflective coating applied to or fabricated on the surface of the fluid distribution device upon which light is projected or reflected.

FIGS. 12a-12f schematically show (the support S has just been schematically represented by a rectangle) alternative embodiments of the device of the present invention, differing from one another in that they include different arrangements of excitation light means.

Figure 12A:
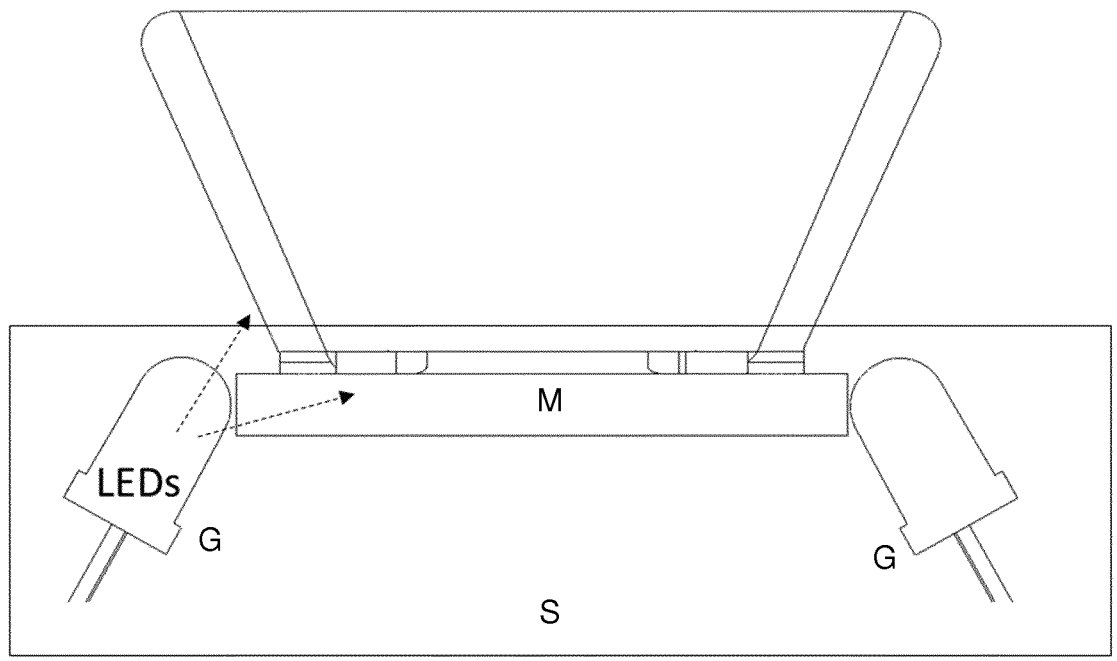
FIGS. 12*a* to 12*f* schematically show part of the device of the present invention, for alternative embodiments differing from one another in that they include different arrangements of excitation light means.
Figure 12B:
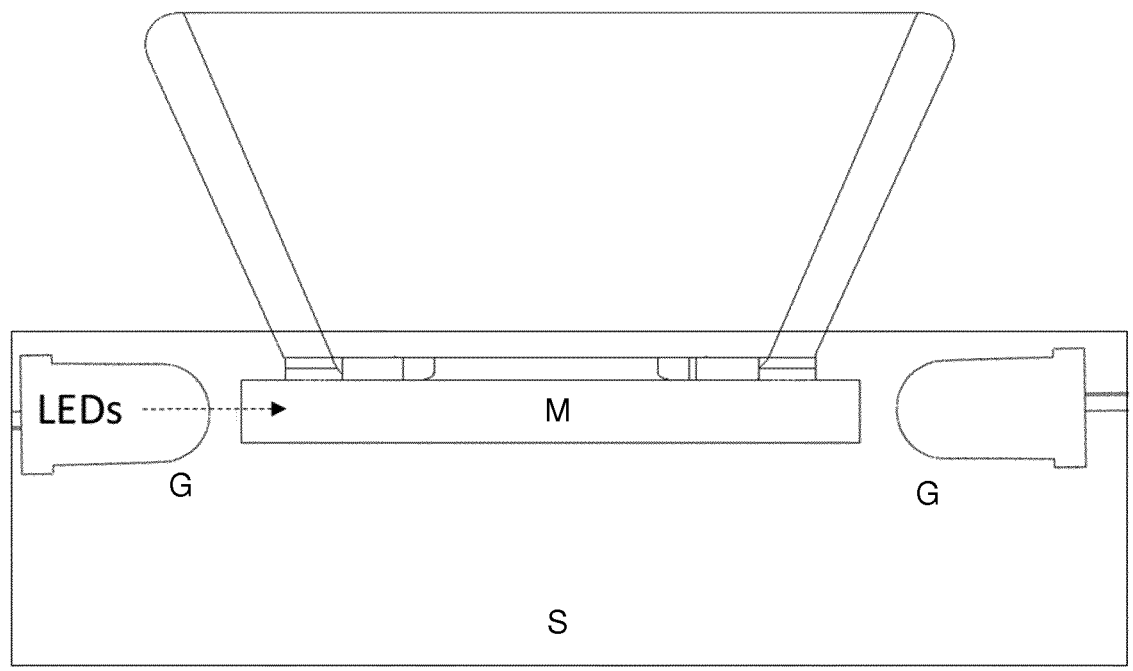

Specifically, for the embodiment shown in FIGS. 12a and 12b, the excitation light means comprises two LEDs G, arranged on two respective side edges of the translucent plate of the microfluidic chip M, tilted upwards at FIG. 12a and orthogonally to said side edges at FIG. 12b.

Figure 12C:
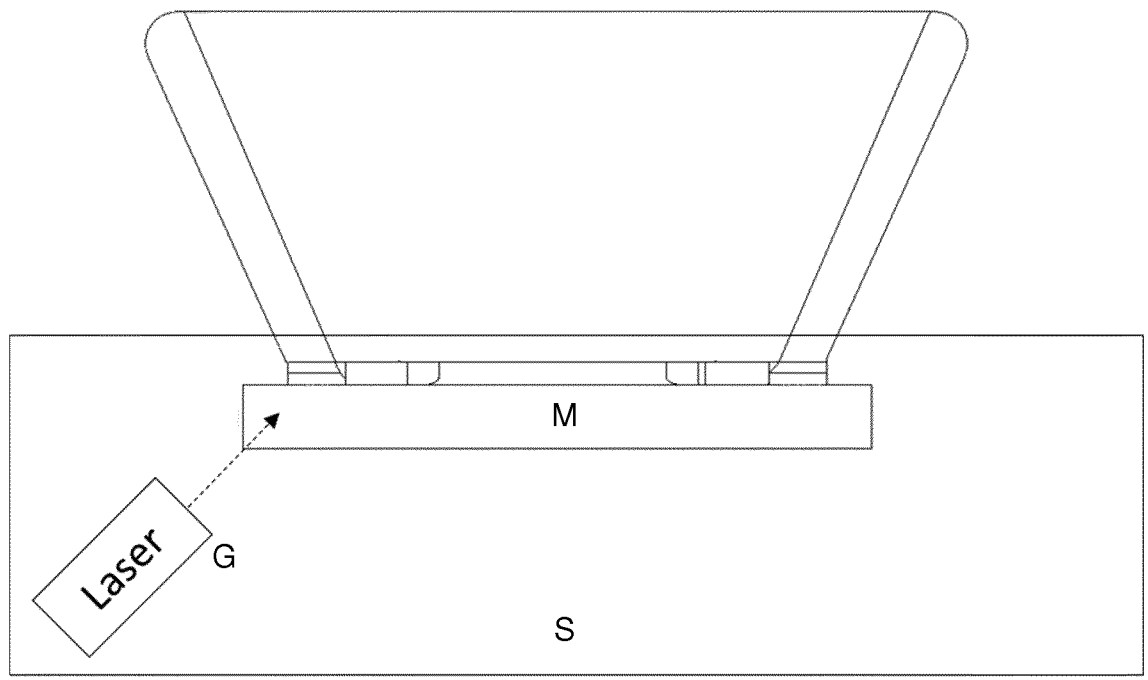
Figure 12D:
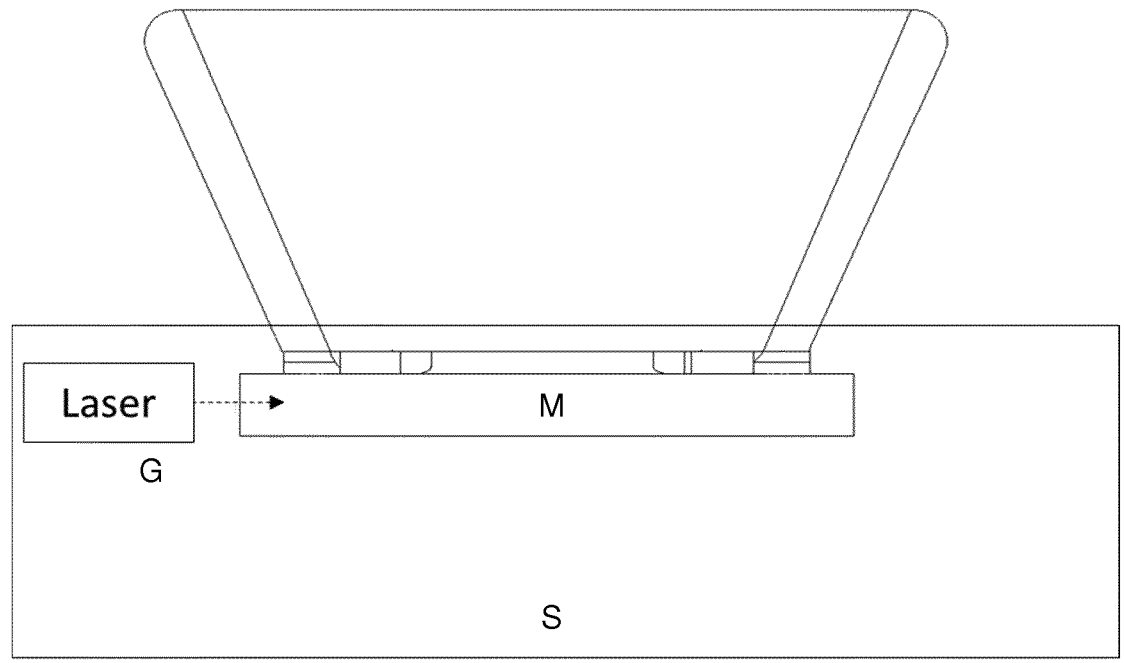

The embodiments shown in FIGS. 12c and 12d differ from those of FIGS. 12a and 12b in that the excitation light means comprises one laser source G arranged on one side edge of the translucent plate of the microfluidic chip M, tilted upwards at FIG. 12c and orthogonally to the side edge at FIG. 12d.

Figure 12E:
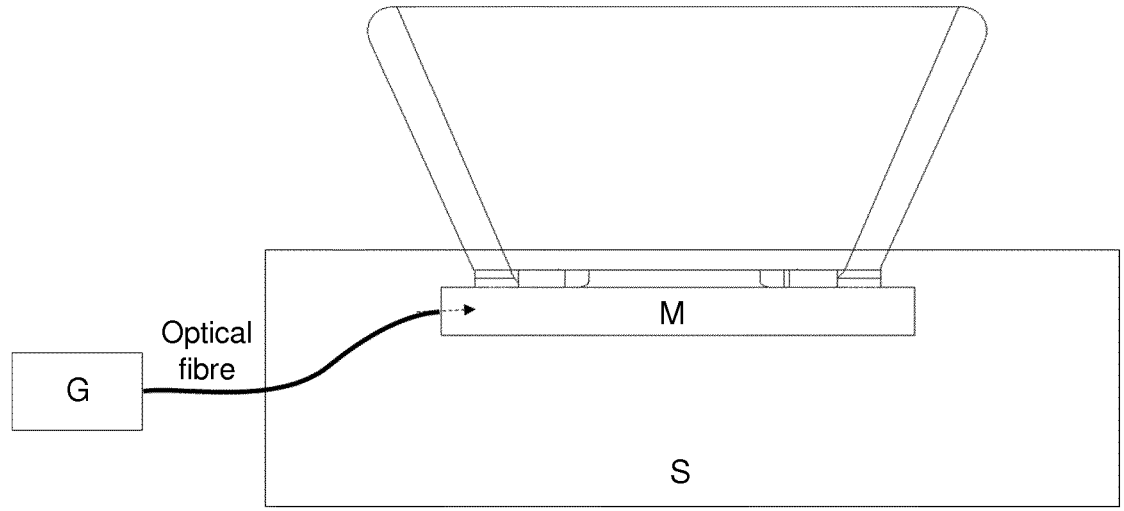

For the embodiment shown in FIG. 12e, the excitation light means comprises a light source G and an optical fibre optically coupled thereto to direct light emitted thereby to one of the side edges of the translucent plate of the microfluidic chip M.

Figure 12F:
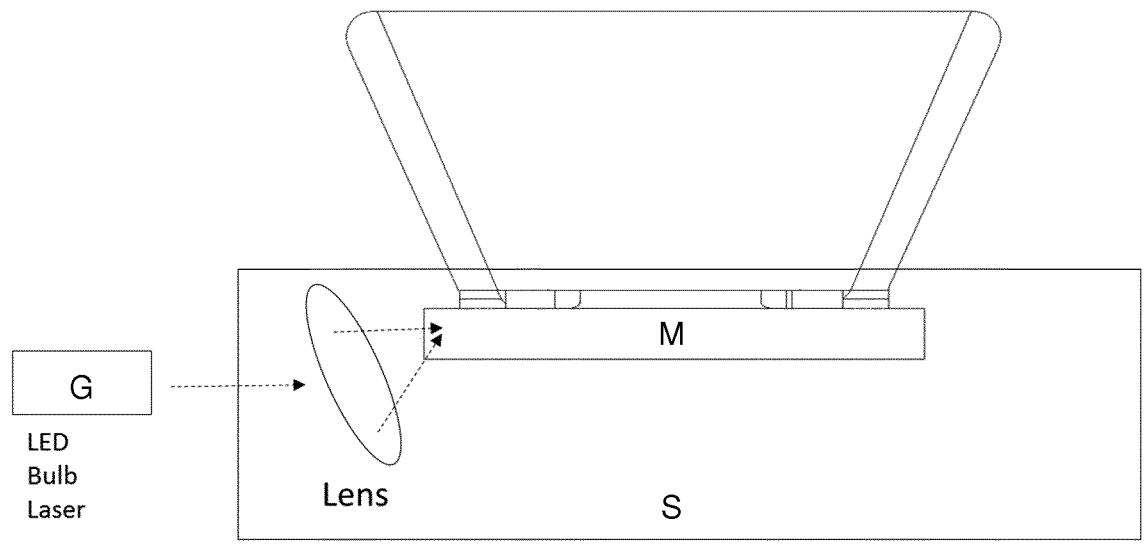

For the embodiment of FIG. 12f light emitted by light source G is directed and lensed by tilted a tilted lens towards one of the side edges of the translucent plate of the microfluidic chip M.

For anon-illustrated embodiment, instead or complementarily to the above mentioned lens, another optical element is placed between the light source G and the side edge of the microfluidic chip M, such as a reflective coating arranged on a specific region of the support S.

Experimental Validation:

The sample contained in the microfluidic channels Mc of the microfluidic chip M may consist of one or more areas of interest. In one implementation, the sample is distributed along a two-dimensional array, with the rows being defined by the channels Mc and the columns being arbitrary determined by the deposition of reagents to limited areas. Such a sample array simplifies test multiplexing and enables high-throughput screening in a reduced area and with a reduced consumption of reagents. Imaging such an array using conventional microscopy techniques may be laborious or result in images of low quality.

In the device of the present invention, a fast, compact and cost effective method has been devised to image the above mentioned array with high sensitivity thanks to the reduction in background noise provided by the light suppressing and light blocking elements integrated in the support S. Thanks to this integration, the device is capable of imaging simultaneously the entire sample area of the microfluidic consumable (20×20 mm) with better signal to noise ratio than a commercial microscopy system and in a fraction of the time (approximately 0.01 vs 10 minutes). Alternative array scanning systems have been previously described, but generally they are large and expensive laboratory instruments that cannot be easily transported and used at the point of care. The developments associated to the device of the present invention have enabled to deliver a measurement system of such capability at reduced cost, weight and dimensions.

The present inventors have built a prototype of the device of the present invention, and performed detection measurements on a sample, and have also performed measurements on the same sample with a laboratory microscope, in order to perform a signal-to-noise values comparison.

The table below shows the results obtained, in the form of signal over noise values for signals of varying intensities. The prototype of the present invention is called therein "hand-held prototype" (built according to FIGS. 1 to 9) and the laboratory microscope is a NIKON microscope, particularly model Nikon Eclipse Ti, with illumination by means of an halogen lamp associated to an Olympus U-DCD condenser, and with an objective Nikon S FLuor; 10×/0.50.

| Signal Intensity | Signal-to-noise | |
|---|---|---|
| | Handheld prototype | NIKON |
| 100 | 5.56 | 2.08 |
| 80 | 3.88 | 1.93 |
| 75 | 3.52 | 1.89 |
| 65 | 3.03 | 1.65 |
| 50 | 2.46 | 1.48 |
| 30 | 1.55 | 1.23 |

The results included in the above table prove that the device of the present invention provides such good detection results that improve not only those provided by hand-held devices but also those achieved by some commercial laboratory microscopes.

A person skilled in the art could introduce changes and modifications in the embodiments described without departing from the scope of the invention as it is defined in the attached claims.

The invention claimed is:

1. A hand-held microfluidic detection device, comprising:
a microfluidic cell having at least one chamber intended to at least contain a sample;
a support configured for the attachment thereto of said microfluidic cell;
an excitation light arrangement arranged at least in part in said support to side illuminate said at least one chamber of said microfluidic cell to excite said sample contained therein; and
an optical detector configured and arranged to detect light emitted from said sample when excited with said side illumination;
wherein the device further comprises a casing constituting an envelope into which at least said support is housed and attached, and in that said support comprises a housing for removably attaching said microfluidic cell,
wherein said microfluidic cell is a microfluidic flow cell where said at least one chamber is a channel for containing said sample flowing there within, wherein said support includes a fluidic manifold configured to fluidically communicate at least one manifold fluidic channel thereof with said at least one channel when the microfluidic flow cell is attached to the support,
wherein said optical detector is configured and arranged to detect first light rays of said light emitted from said sample which depart from the sample according to one or more first emission directions going towards the optical detector, and wherein the device further comprises a parasitic light suppressing mechanism configured to avoid the impingement on the optical detector of second light rays of the light emitted from the sample or from another location of the microfluidic cell, which depart therefrom according to second emission directions opposed to sad first emission directions, or to at least attenuate the intensity of said second light rays before impinging on the optical detector,
wherein the support comprises a plate with a through hole and a coupling arrangement to removably couple the microfluidic cell over said through hole, and wherein the optical detector is arranged below said through hole to receive and detect said first light rays emitted from the sample and passing through the trough hole,
wherein said microfluidic cell is a microfluidic chip having a translucent plate with first and second opposite major surfaces sandwiching said at least one channel, wherein when the microfluidic chip is attached to the support said first major surface faces the optical detector, and wherein said parasitic light suppressing mechanism comprises at least a first deflection arrangement configured to deflect said second light rays once they have transmitted through said translucent plate through said second major face so that they either do not impinge on the optical detector or their intensity is attenuated before impinging on the optical detector, and wherein said first deflection arrangement comprises one or more first deflection walls arranged over said second major surface of the translucent plate of the microfluidic chip and extending perpendicularly or divergently with respect to said second major surface from first ends up to second ends.

2. The device according to claim 1, wherein said parasitic light suppressing mechanism further comprises a second deflection arrangement configured to deflect the second light rays once they have been deflected by said first deflection arrangement.

3. The device according to claim 2, wherein said second deflection arrangement comprises one or more second deflection walls extending convergently towards the second major surface of the translucent plate of the microfluidic chip from first ends, placed at a plane arranged over the second ends of the first deflection walls, up to second ends.

4. The device according to claim 3, wherein the one second deflection wall of the second deflection arrangement forms one of a cone and a convex curved cap.

5. The device according to claim 3, wherein the second deflection walls of the second deflection arrangement form a pyramid.

6. The device according to claim 3, wherein two second deflection walls of the second deflection arrangement converge, at their second ends, into a longitudinal edge.

7. The device according to claim 6, wherein a projection of said longitudinal edge on the second major surface of the translucent plate of the microfluidic chip follows a direction that is orthogonal or substantially orthogonal to a main illumination plane of said side illumination.

8. The device according to claim 7, wherein a longitudinal axis of said at least one channel of the microfluidic chip, when the microfluidic chip is attached to the support, occupies said main illumination plane.

9. The device according to claim 8, wherein the microfluidic chip comprises at least two of said at least one channel, one of them being configured and arranged so that a longitudinal axis thereof, when the microfluidic chip is attached to the support, occupies an illumination plane that is parallel to said main illumination plane and orthogonal or substantially orthogonal to said projection of said longitudinal edge.

10. The device according to claim 7, wherein said longitudinal edge belongs to a plane that is parallel or substantially parallel to the second major surface of the translucent plate of the microfluidic chip, when the microfluidic chip is attached to the support.

11. The device according to claim 3, wherein the casing comprises a top portion having a region which defines said plane at which the first ends of the one or more second deflection walls are placed.

12. The device according to claim 1, wherein the one first deflection wall of the first deflection arrangement forms a hollow truncated cone.

13. The device according to claim 1, wherein the one first deflection wall of the first deflection arrangement is one cylindrical wall that forms a hollow cylinder.

14. The device according to claim 1, wherein the first deflection walls of the first deflection arrangement form a hollow truncated pyramid.

15. The device according to claim 1, wherein the casing comprises a through opening defined at a wall thereof, wherein said through opening is configured and arranged to allow the introduction/extraction there through of the microfluidic cell with respect to the casing and the coupling/uncoupling thereof by said coupling arrangement.

16. The device according to claim 1, wherein said optical detector is also housed into said casing.

17. The device according to claim 1, further comprising an electric and electronic system operatively connected to said optical detector, to power and control the operation thereof and also to receive and process detection signals generated thereby to perform optical measurements, and connected to said excitation light arrangement, to power and control the operation thereof, and to a user interface included in the device which includes at least a user input mechanism and a display to control the operation of the device by a user and display at least graphical information related to said optical measurements.

18. The device according to claim 1, wherein the support further comprises liquid and pneumatic connectors for liquid delivery and collection to/from the at least one manifold fluidic channel, wherein said connectors are accessible from outside the casing to removably couple thereto at least one of the following components: liquid and/or gas reservoirs, external pumps, valves and actuators.

19. The device according to claim 1, wherein said excitation light arrangement comprises at least one light generating unit, wherein said light generating unit and/or an optical element directing light generated thereby is/are attached to the support such that a light beam generated by the light generating unit goes towards a respective side edge of the translucent plate of the microfluidic chip, either with an optical axis which is orthogonal to said side edge or with an optical axis which is transversal but not orthogonal to said side edge and has an emission direction away from the optical detector.

20. The device according to claim 1, further comprising a deformable sealing gasket configured and arranged to be placed, when the microfluidic chip is attached to the support, between the microfluidic chip and the support to ensure a gas-tight seal between the two.

21. The device according to claim 20, wherein said deformable sealing gasket comprises two or more O-rings interconnected through a film frame, thinner than the two or more O-rings, so that each of the two or more O-rings is configured and arranged to be positioned, when the microfluidic chip is attached to the support, in correspondence with a respective opening of the at least one channel of the microfluidic chip and a respective opening of the at least one manifold fluidic channel, wherein said film frame defines a central through-opening configured and arranged to be in correspondence with said through hole of the plate of the support.

* * * * *